(12) United States Patent
Girin et al.

(10) Patent No.: US 12,646,727 B2
(45) Date of Patent: Jun. 2, 2026

(54) ADDITIONAL COOLING PACK WITH FANS TO HANDLE AND PEAK SHAVE FUEL CELL TRANSIENTS AND HIGH AMBIENT TEMPERATURES

(71) Applicant: Caterpillar Inc., Peoria, IL (US)

(72) Inventors: Cédric Girin, St. Martin d'Uriage (FR); Alex R. Mohning, Edwards, IL (US); Mark A. Holub, Chillicothe, IL (US); Justin J. Graupman, Chillicothe, IL (US); Eric T. Heille, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 362 days.

(21) Appl. No.: 18/451,540

(22) Filed: Aug. 17, 2023

(65) Prior Publication Data

US 2025/0062371 A1 Feb. 20, 2025

(51) Int. Cl.

| | |
|---|---|
| *H01M 8/04029* | (2016.01) |
| *B60L 58/33* | (2019.01) |
| *E02F 9/08* | (2006.01) |
| *H01M 8/04014* | (2016.01) |
| *H01M 8/0432* | (2016.01) |
| *H01M 8/04701* | (2016.01) |

(52) U.S. Cl.
CPC ......... *H01M 8/04029* (2013.01); *B60L 58/33* (2019.02); *E02F 9/0866* (2013.01); *H01M 8/04014* (2013.01); *H01M 8/04358* (2013.01); *H01M 8/04723* (2013.01); *B60L 2200/40* (2013.01); *H01M 2250/20* (2013.01)

(58) Field of Classification Search
CPC ......... H01M 8/04029; H01M 8/04723; H01M 2250/20; B60L 2200/40
USPC ........................................................ 165/287
See application file for complete search history.

(56) References Cited

U.S. PATENT DOCUMENTS

| | | | |
|---|---|---|---|
| 8,685,581 B2 | 4/2014 | Scheibert | |
| 8,822,093 B2* | 9/2014 | Kim ...................... | B60K 11/04 |
| | | | 429/436 |
| 9,979,056 B2* | 5/2018 | Maguire ............... | F04D 27/005 |

(Continued)

FOREIGN PATENT DOCUMENTS

| | | |
|---|---|---|
| CN | 215834556 U | 2/2022 |
| DE | 102020106088 A1 | 9/2021 |

(Continued)

*Primary Examiner* — Steve S Tanenbaum

(57) ABSTRACT

A work machine cooling system for cooling primary power source cooling fluid for a primary power source may include a primary power source cooling unit and a second power source cooling unit fluidly connected so that primary power source cooling fluid flows from the primary power source through the primary and secondary power source cooling units is discharged back to the primary power source. The work machine cooling system may further include a primary cooling fan disposed proximate the primary fuel cell cooling unit to discharge airflow onto the primary fuel cell cooling unit, and a secondary cooling fan disposed proximate the secondary fuel cell cooling unit to discharge airflow onto the secondary fuel cell cooling unit. The secondary cooling fan may be turned off until the primary cooling fluid temperature is greater than a transient event threshold temperature indicating the occurrence of a transient thermal event.

21 Claims, 4 Drawing Sheets

(56)     References Cited

U.S. PATENT DOCUMENTS

| | | | | |
|---|---|---|---|---|
| 10,439,238 B2 | 10/2019 | Riley et al. | | |
| 10,811,710 B2 * | 10/2020 | Nada | ............... | H01M 8/04701 |
| 2006/0063048 A1 * | 3/2006 | Kolodziej | ......... | H01M 8/04992 |
| | | | | 429/430 |
| 2020/0331361 A1 | 10/2020 | Lynk et al. | | |
| 2023/0155149 A1 * | 5/2023 | Farnsworth | ....... | H01M 8/04723 |
| | | | | 429/437 |

FOREIGN PATENT DOCUMENTS

| | | | |
|---|---|---|---|
| DE | 102020113328 A1 | 11/2021 | |
| KR | 102029778 B1 | 10/2019 | |

* cited by examiner

ADDITIONAL COOLING PACK WITH FANS TO HANDLE AND PEAK SHAVE FUEL CELL TRANSIENTS AND HIGH AMBIENT TEMPERATURES

TECHNICAL FIELD

The present disclosure relates generally to fuel cell powered work machines and, more particularly, to fuel cell powered work machines having additional cooling packs for managing fuel cell transients and high ambient temperatures.

BACKGROUND

Fuel cell systems enable electrical power to be generated with low emissions and high efficiency. For this reason, efforts are being made to apply fuel cell systems in various mobile applications, including work machines such as electric drive dozers. In these work machines, internal combustion engines are replaced by fuel cells to provide electrical power to drive motors in the power train systems as well as replace generators currently used for on-board electrical power supply.

In addition to generating electrical energy, fuel cells, when in operation, generate thermal energy that must be removed from the fuel cell with the aid of a cooling system to prevent overheating that can cause damage to the fuel cells. In the case of work machines, fuel cells have a high capacity in respect of generating electrical energy and, correspondingly, also generates a large quantity of thermal energy that has a high cooling requirement. In some implementations, fuel cells are cooled by causing coolant to flow past and around and thereby draw heat from the fuel cells. The coolant then flows through a cooling unit such as a radiator or other type of heat exchanger where heat may be dissipated to the ambient environment in the same way that heat is dissipated from work machines with internal combustion engines. Heat from other systems of the work machine may be dissipated in a similar manner. Heat dissipation is increased by airflow over the cooling unit that is created naturally by movement of the work machine and/or artificially by a fan or other device for creating airflow.

An example of a cooling system for a vehicle powered by a fuel cell is provided by U.S. Pat. No. 8,822,093, entitled "Cooling System for Fuel Cell Vehicle" issued to Kim et al. on Sep. 2, 2014. The Kim et al. patent discloses a cooling system for a fuel cell vehicle that employs a single integrated radiator disposed on a front side of the vehicle and is configured to cool cooling fluid by exchanging heat using exterior air to integrally manage a fuel cell stack and an electrical power apparatus. The integrated radiator is divided into a first high temperature region and a second low temperature region according to a flow requirements so that the fuel cell stack is cooled with cooling fluid flowing through the high temperature region and the electrical power apparatus is cooled with cooling fluid flowing through the low temperature region.

Cooling requirements for fuel cell powered work machines can be challenging to achieve with traditional air-cooled heat exchangers. For example, work machines such as dozers operate at low speeds that result in relatively low natural air flow. Work machines also work in environments that are subjected to high ambient temperatures resulting in reduced temperature gradients between the ambient air and the cooling fluid in the cooling unit. Additionally, the fuel cells of the work machines provide power to operate implements of the work machine when the work machine is moving or stationary that create transient thermal event with increased power demands on the fuel cells and corresponding increased heat generation that are not experienced by the other machine systems.

SUMMARY OF THE DISCLOSURE

In one aspect of the present disclosure, a work machine cooling system for cooling fuel cell cooling fluid for fuel cells of a work machine is disclosed. The work machine cooling system may include a primary fuel cell cooling unit having a primary unit inlet port and a primary unit outlet port, wherein the primary unit inlet port may be fluidly connected to receive the fuel cell cooling fluid from the fuel cells, and a secondary fuel cell cooling unit having a secondary unit inlet port and a secondary unit outlet port. The secondary unit inlet port may be fluidly connected to the primary unit outlet port to receive the fuel cell cooling fluid from the primary fuel cell cooling unit, and the secondary unit outlet port may be fluidly connected to discharge the fuel cell cooling fluid to the fuel cells. The work machine cooling system may further include a primary cooling fan disposed proximate the primary fuel cell cooling unit to discharge a primary airflow onto the primary fuel cell cooling unit, and a secondary cooling fan disposed proximate the secondary fuel cell cooling unit to discharge a secondary airflow onto the secondary fuel cell cooling unit.

In another aspect of the present disclosure, a method for cooling fluid temperature control of primary power source cooling fluid for a primary power source of a work machine is disclosed. The work machine may include a primary power source cooling unit having a primary unit inlet port fluidly connected to receive the primary power source cooling fluid from the primary power source, and a primary unit outlet port. The work machine may further include a secondary power source cooling unit fluidly connected to the primary unit outlet port to receive the f primary power source cooling fluid from the primary power source cooling unit, and a secondary unit outlet port fluidly connected to discharge the primary power source cooling fluid to the power source. The method may include comparing a primary cooling fluid temperature $T_{PCF}$ of the primary power source cooling fluid at the primary power source cooling unit to a transient event threshold temperature $T_{TET}$. In response to determining that the primary cooling fluid temperature $T_{PCF}$ is not greater than the transient event threshold temperature $T_{TET}$, the method may include setting a primary cooling fan to a first primary cooling fan speed $v_{PF}$ corresponding to the primary cooling fluid temperature $T_{PCF}$ to discharge a first airflow onto the primary power source cooling unit, and setting a secondary cooling fan to a first secondary cooling fan speed $v_{SF}$ equal to zero to prevent discharge of a second airflow onto the secondary power source cooling unit. In response to determining that the primary cooling fluid temperature $T_{PCF}$ is greater than the transient event threshold temperature $T_{TET}$, the method may include setting the primary cooling fan to a second primary cooling fan speed $v_{PF}$ corresponding to the transient event threshold temperature $T_{TET}$ to discharge the first airflow onto the primary power source cooling unit, and setting the secondary cooling fan to a second secondary cooling fan speed $v_{SF}$ corresponding to a secondary cooling fluid temperature $T_{SCF}$ of the primary power source cooling fluid at the secondary power source cooling unit to discharge the second airflow onto the secondary power source cooling unit.

In a further aspect of the present disclosure, a work machine is disclosed. The work machine may include a primary fuel cell cooling unit having a primary unit inlet port and a primary unit outlet port, wherein the primary unit inlet port may be fluidly connected to receive the fuel cell cooling fluid from the fuel cells, and a secondary fuel cell cooling unit having a secondary unit inlet port and a secondary unit outlet port, wherein the secondary unit inlet port may be fluidly connected to the primary unit outlet port to receive the fuel cell cooling fluid from the primary fuel cell cooling unit, and the secondary unit outlet port may be fluidly connected to discharge the fuel cell cooling fluid to the fuel cells. The work machine may further include a primary cooling fan disposed proximate the primary fuel cell cooling unit to discharge a primary airflow onto the primary fuel cell cooling unit, a secondary cooling fan disposed proximate the secondary fuel cell cooling unit to discharge a secondary airflow onto the secondary fuel cell cooling unit, a primary cooling unit temperature sensor operatively coupled to the primary fuel cell cooling unit to sense a primary cooling fluid temperature $T_{PCF}$ of the fuel cell cooling fluid at the primary fuel cell cooling unit, and a secondary cooling unit temperature sensor operatively coupled to the secondary fuel cell cooling unit to sense a secondary cooling fluid temperature $T_{SCF}$ of the fuel cell cooling fluid at the secondary primary fuel cell cooling unit. The work machine may also include a work machine controller operatively connected to the primary cooling fan, the secondary cooling fan, the primary cooling unit temperature sensor and the secondary cooling unit temperature sensor. The work machine controller may be programmed to receive primary temperature sensor signals from the primary cooling unit temperature sensor, determine a primary cooling fluid temperature $T_{PCF}$ of the fuel cell cooling fluid at the primary fuel cell cooling unit based on the primary temperature sensor signals, receive secondary temperature sensor signals from the secondary cooling unit temperature sensor, determine a secondary cooling fluid temperature $T_{SCF}$ of the fuel cell cooling fluid at the secondary fuel cell cooling unit based on the secondary temperature sensor signals, and compare the primary cooling fluid temperature $T_{PCF}$ to a transient event threshold temperature $T_{TET}$. In response to determining that the primary cooling fluid temperature $T_{PCF}$ is not greater than the transient event threshold temperature $T_{TET}$, the work machine controller may be programmed to transmit primary fan control signals to the primary cooling fan to set the primary cooling fan to a first primary cooling fan speed $v_{PF}$ corresponding to the primary cooling fluid temperature $T_{PCF}$ to discharge the primary airflow onto the primary fuel cell cooling unit, and transmit secondary fan control signals to the secondary cooling fan to set the secondary cooling fan to a first secondary cooling fan speed $v_{SF}$ equal to zero to prevent discharge of the secondary airflow onto the secondary fuel cell cooling unit. In response to determining that the primary cooling fluid temperature $T_{PCF}$ is greater than the transient event threshold temperature $T_{TET}$, the work machine controller may be programmed to transmit the primary fan control signals to the primary cooling fan to set the primary cooling fan to a second primary cooling fan speed $v_{PF}$ corresponding to the transient event threshold temperature $T_{TET}$ to discharge the primary airflow onto the primary fuel cell cooling unit, and transmit the secondary fan control signals to the secondary cooling fan to set a second secondary cooling fan to the secondary cooling fan speed $v_{SF}$ corresponding to the secondary cooling fluid temperature $T_{SCF}$ to discharge the secondary airflow onto the secondary fuel cell cooling unit.

Additional aspects are defined by the claims of this patent.

DETAILED DESCRIPTION

Figure 1:
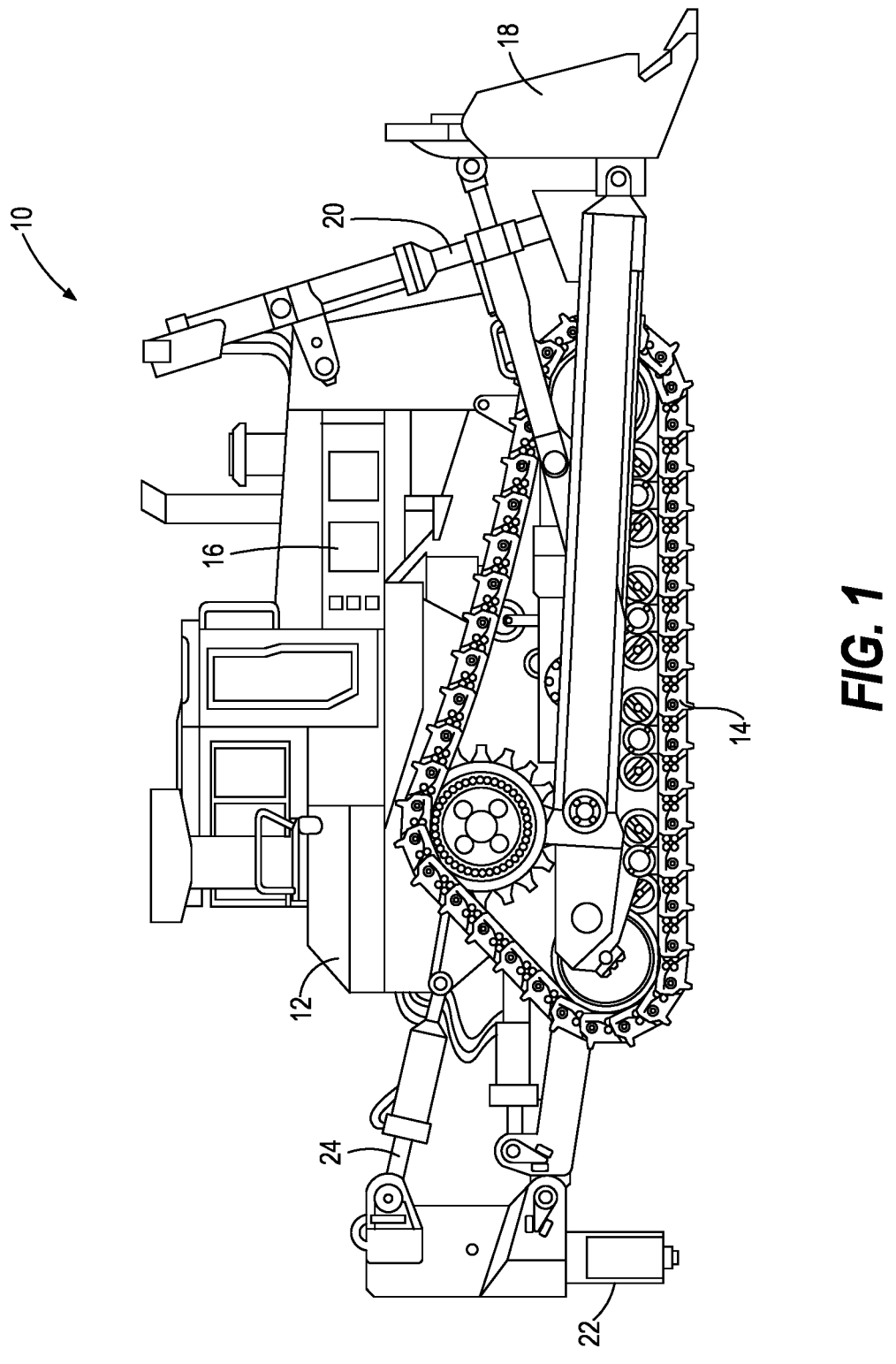
FIG. 1 is a side view of a work machine in which work machine cooling systems in accordance with the present disclosure may be implemented.

FIG. 1 illustrates an exemplary work machine 10 that may be powered by primary power source that generates heat, such as fuel cells, a diesel engine, a gas-power engine or other type of internal combustion engines and the like, and cooled by cooling systems in accordance with the present disclosure. While the work machine 10 is depicted as a dozer, those skilled in the art will understand that the work machine 10 may be of any suitable type, such as those used in construction, farming, mining, transportation, or the like that may be subjected to heat transients and high ambient temperatures. In other examples, the work machine 10 may be any suitable work machine 10, such as a loader, an excavator, a tank, a backhoe, a drilling machine, a trencher, a combine, or any other on-highway or off-highway vehicle.

In the exemplary work machine 10 illustrated and described herein, the primary power source is fuel cells. However, those skilled in the art will understand that cooling systems in accordance with the present disclosure may be implemented in work machines 10 to cool other types of primary power sources that generate heat during operation of the work machine 10 such as those discussed above. The implementation of the cooling systems in accordance with the present disclosure in such work machines 10 is contemplated by the inventors.

The machine 10 may include a frame 12 on which other elements of the work machine 10 are mounted. The work machine 10 includes a propulsion system 14, such as a track chain assembly as shown. Alternatively, the work machine 10 may have any other suitable type of propulsion system 14, such as wheels and tires. The work machine 10 may be an electrically powered machine that includes fuel cells 16 to provide electrical power to drive the propulsion system 14 as well as the other systems of the work machine 10. The work machine 10 may further include a first work implement 18 at a front end of the frame 12 that may be manipulated by actuation of a first hydraulic system 20 that is powered by the fuel cells 16 to perform work functions. The work machine 10 may also include a transmission system (not shown) that mechanically couples a drive motor (not shown) powered by the fuel cells 16 to the propulsion system 14 to propel the work machine 10 over a work surface. A second work implement 22 mounted at a rear end of the frame 12 may be manipulated by a second hydraulic system 24 that is also powered by the fuel cells 16 to perform other work functions. While the first work implement 18 is illustrated as a blade and the second work implement 22 is illustrated as a hydraulic hammer, those skilled in the art will understand that the work machine 10 may be outfitted with more or fewer implements, and with alternative implements, to perform the necessary work functions for which the work machine 10 is designed.

Figures 2, 3:
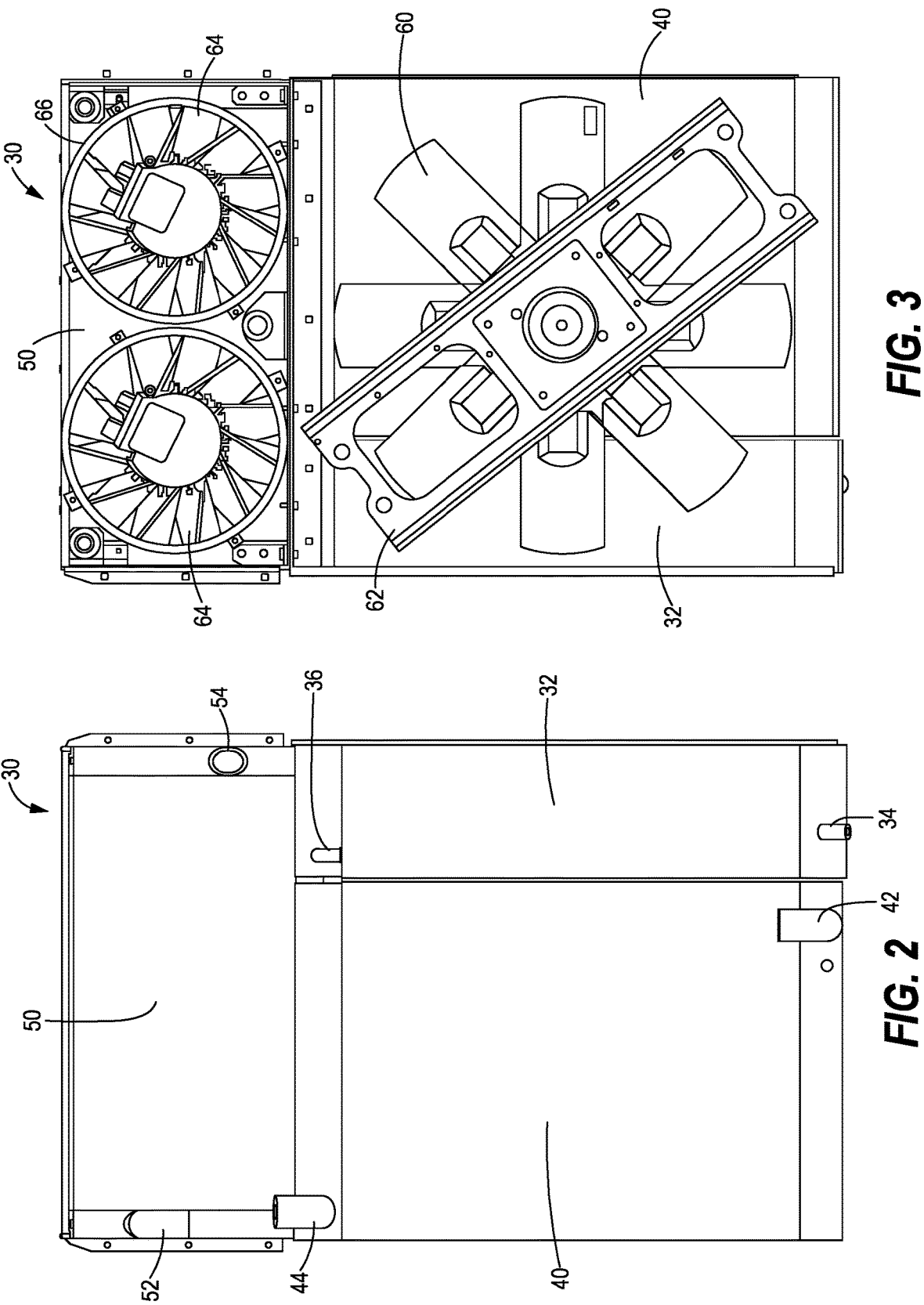
FIG. 2 is a front view of an embodiment of a work machine cooling system in accordance with the present disclosure.
FIG. 3 is a rear view of the work machine cooling system of FIG. 2.

FIGS. 2 and 3 illustrate a work machine cooling system 30 in accordance with the present disclosure that is configured to cool the various heat generating systems of the work machine 10. The cooling system 30 may be particularly useful in cooling the fuel cells 16 during low speed operation, high ambient conditions, and fuel cell transient conditions. Referring to FIG. 2, the cooling system 30 may include a mechanical system cooling unit 32 that may be in the form of a radiator or other heat exchanger that will facilitate heat transfer from cooling fluid from various mechanical systems (not shown) to the ambient atmosphere. The mechanical system cooling fluid may enter the mechanical system cooling unit 32 through a mechanical unit inlet port 34, circulate through the mechanical system cooling unit 32, and exit the mechanical system cooling unit 32 through a mechanical unit outlet port 36. The cooling fluid exiting the mechanical unit outlet port 36 may circulate back to the mechanical systems to dissipate heat from those systems and return to the mechanical unit inlet port 34.

The work machine cooling system 30 may further include a primary fuel cell cooling unit 40 that similarly may be in the form of a radiator or other heat exchanger that will facilitate heat transfer from cooling fluid from the fuel cells 16 to the ambient atmosphere. The fuel cell cooling fluid may enter the primary fuel cell cooling unit 40 through a primary unit inlet port 42, circulate through the primary fuel cell cooling unit 40, and exit the primary fuel cell cooling unit 40 through a primary unit outlet port 44. Instead of returning directly to the fuel cells 16, the fuel cell cooling fluid may pass through a secondary fuel cell cooling unit 50 where additional heat may be removed from the fuel cell cooling fluid. The secondary fuel cell cooling unit 50 may have a secondary unit inlet port 52 that is fluidly connected to the primary unit outlet port 44 to receive the fuel cell cooling fluid. The fuel cell cooling fluid may then circulate through the secondary fuel cell cooling unit 50 and exit the secondary fuel cell cooling unit 50 through a secondary unit outlet port 54. The cooling fluid exiting the secondary fuel cell outlet port 54 may circulate back to the fuel cells 16 to dissipate heat from the fuel cells 16 and return to primary unit inlet port 42.

The work machine cooling system 30 may be installed within the frame 12 proximate the front end of the work machine 10. The frame 12 may include a cooling system opening (not shown) at the front end, with the work machine cooling system 30 being oriented with the surfaces shown in FIG. 2 facing forward at the opening so that airflow caused by travel of the work machine 10 flows over those surfaces to dissipate heat. FIG. 3 illustrates the rearward facing side of the work machine cooling system 30 and the corresponding components. The work machine cooling system 30 may include a primary cooling fan 60 mounted on a primary fan bracket 62 that is directly or indirectly mounted to the frame 12. The primary cooling fan 60 is positioned to discharge airflow on the rear surfaces of the mechanical system cooling unit 32 and the primary fuel cell cooling unit 40 when the primary cooling fan 60 is operating. The work machine cooling system 30 further includes one or more secondary cooling fans 64 mounted on a secondary fan frame 66 that is directly or indirectly mounted to the frame 12. The secondary cooling fans 64 are positioned to discharge airflow on the rear surface of the secondary fuel cell cooling unit 50 when the secondary cooling fans 64 are operating.

The fans 60, 64 may be electric fans, hydraulic fans, mechanically-driven fans or the like. The primary cooling fan 60 may be larger than the secondary cooling fans 64 as illustrated in FIGS. 2 and 3, or the secondary cooling fans 64 may be the same size or larger than the primary cooling fan 60. Additionally, the fans 60, 64 may be power by the same source or different sources depending on the requirements or limitations of a particular implementation. Regardless of the relative configurations of the fans 60, 64, the secondary cooling fans 64 may be utilized to peak shave for the whole system during transient thermal events where the primary cooling fan 60 operating alone may require more energy or be slower to react to the transient thermal events.

The additional airflow provided by the cooling fans 60, 64 over the cooling units 32, 40, 50 serves to regulate the heat dissipation provided by the work machine cooling system 30 in accordance with the present disclosure. During normal operating conditions (i.e., work machine 10 operating and traveling through a worksite, moderate ambient temperatures and no fuel cell transient temperature peaks), the primary cooling fan 60 may be operated as necessary to cool the mechanical systems and the fuel cells 16 without engaging the secondary cooling fans 64. As the work machine 10 is operating, a primary cooling fluid temperature $T_{PCF}$ at the primary fuel cell cooling unit 50 may be monitored to detect when the demand for power on the fuel cells 16 causes a transient thermal event that increases the temperature of the fuel cells 16 and the heat transfer to the fuel cell cooling fluid, thereby raising the temperature of the fuel cell cooling fluid. A primary cooling fan speed $v_{PF}$ may be adjusted as the primary cooling fluid temperature $T_{PCF}$ rises to increase heat transfer at the primary fuel cell cooling unit 40 to maintain the temperature $T_{CFP}$ below a transient event threshold temperature $T_{TET}$. When the primary cooling fluid temperature $T_{PCF}$ reaches the transient event threshold temperature $T_{TET}$, the secondary cooling fans 64 may be activated to increase the heat dissipation from the fuel cell cooling fluid as it flows through the secondary fuel cell cooling unit 50.

During this time, the primary cooling fan 60 may be maintained at a constant speed as the primary cooling fluid temperature $T_{PCF}$ at the primary fuel cell cooling unit 40 continues to rise because the secondary fuel cell cooling unit 50 provides additional cooling. If the transient thermal event is temporary and the primary cooling fluid temperature $T_{PCF}$ at the primary fuel cell cooling unit 40 drops below the transient event threshold temperature $T_{TET}$, the secondary cooling fans 64 may be stopped, and the primary cooling fan 60 may again be used exclusively to control the temperature of the fuel cell cooling fluid. If the transient thermal event persists or increases, or the power demand on the fuel cells 16 is more than a temporary transient thermal event, the additional cooling provided by the secondary fuel cell cooling unit 50 may not sufficiently cool the fuel cell cooling fluid. At some point, a secondary cooling fluid temperature $T_{SCF}$ of fuel cell cooling fluid at the secondary fuel cell cooling unit 50 may exceed a transient event maximum temperature $T_{TEM}$ where it becomes necessary to increase the primary cooling fan speed $v_{PF}$ above the transient event threshold speed $v_{TET}$ to cool the fuel cell cooling fluid sufficiently to prevent damage to the fuel cells 16. The primary cooling fan 60 may continue to run at the increased speed until the secondary cooling fluid temperature $T_{SCF}$ at the secondary fuel cell cooling unit 50 falls below the transient event maximum temperature $T_{TEM}$, at which time the primary cooling fan 60 may return to the transient event threshold speed $v_TET$. This cycle of adjusting the speed of the primary cooling fan 60 and starting and stopping the secondary cooling fans 64 may continue as the work machine 10 operates to control the temperature of the fuel cell cooling fluid and protect the fuel cells 16.

Figure 4:
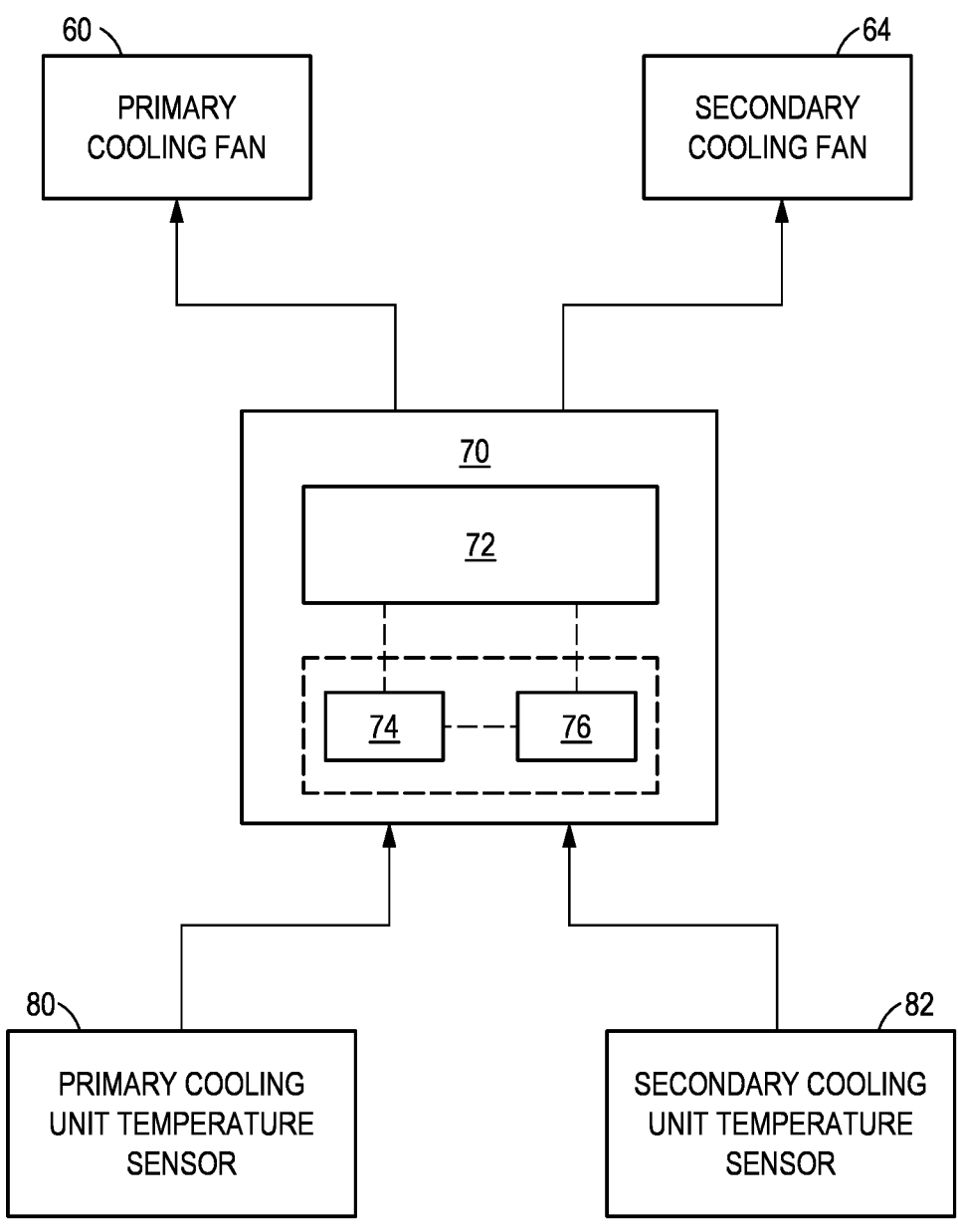
FIG. 4 is a schematic view of operational components and control system components of the work machine cooling system of FIG. 2.

Referring now to FIG. 4, exemplary control system components of the work machine 10 pertaining to the work machine cooling system 30 in accordance with the present disclosure are illustrated. The control system components may include a work machine controller 70 that may include a microprocessor 72 for executing specified programs to control and monitor various systems and functions associated with the work machine 10, including the work machine cooling system 30. The work machine controller 70 may further include a memory 74, such as read only memory (ROM) 74, for storing a program or programs, and a random access memory (RAM) 76 which serves as a working memory area for use in executing the program(s) stored in the memory 74. For example, the memory 74 may store a cooling system control program that is executed by the microprocessor 72 to control the operation of the cooling fans 60, 64 based at least in part on the fuel cell cooling fluid temperatures $T_{CFP}$, $T_{CFS}$. Although the work machine controller 70 is shown, it is also possible and contemplated to use other electronic components such as a microcontroller, an ASIC (application specific integrated circuit) chip, or any other integrated circuit device. The work machine controller 70 may be the sole controller for the work machine 10, or may be one of a number of controllers of the work machine 10 across which control and monitoring of the systems and functions of the work machine 10 are distributed.

The work machine controller 70 may be operatively connected to output devices, including the primary cooling fan 60 and the secondary cooling fans 64. The work machine controller 70 may communicate fan control signals to motors of the cooling fans 60, 64 to regulate their speeds to execute a fuel cell cooling fluid temperature control strategy in accordance with the present disclosure. The work machine controller 70 may also be operatively connected to various input devices. The input devices may include a primary cooling unit temperature sensor 80 that may be any appropriate temperature sensor, such as a thermistor, thermocouple, resistance thermometer or the like, that can sense a temperature and transmit primary temperature sensor signals having values indicative of the sensed temperature. The primary cooling unit temperature sensor 80 may be installed at the primary fuel cell cooling unit 40 to detect the primary cooling fluid temperature $T_{PCF}$ at a relevant location of the primary fuel cell cooling unit 40. In one embodiment, the primary cooling unit temperature sensor 80 may be installed at the primary unit outlet port 44 to sense the primary cooling fluid temperature $T_{PCF}$ after the fuel cell cooling fluid has passed through the primary fuel cell cooling unit 40 and dissipated heat to the ambient environment. Sensing the primary cooling fluid temperature $T_{PCF}$ at this location may provide an indication of whether a transient thermal event is occurring and too much heat is being transferred from the fuel cells 16 for the primary fuel cell cooling unit 40 to cool the fuel cell cooling fluid down to the transient event threshold temperature $T_{TET}$.

The input devices may further include a second cooling unit temperature sensor 82 that may be any appropriate temperature sensor such as those mentioned above. The secondary cooling unit temperature sensor 82 may be installed at the secondary fuel cell cooling unit 50 to detect the secondary cooling fluid temperature $T_{SCF}$ at a relevant location of the secondary fuel cell cooling unit 50. In one embodiment, the secondary cooling unit temperature sensor 82 may be installed at the secondary unit outlet port 54 to sense the secondary cooling fluid temperature $T_{SCF}$ after the fuel cell cooling fluid has passed through both the primary fuel cell cooling unit 40 and the secondary fuel cell cooling unit 50 and dissipated heat to the ambient environment. Sensing the secondary cooling fluid temperature $T_{SCF}$ at this location may provide an indication of whether a transient thermal event or the overall power demand on the fuel cells 16 is causing too much heat to be transferred from the fuel cells 16 for the work machine cooling system 30 to cool the fuel cell cooling fluid down to the transient event maximum temperature $T_{TEM}$ without increasing the primary cooling fan speed $v_{PF}$.

INDUSTRIAL APPLICABILITY

Figure 5:
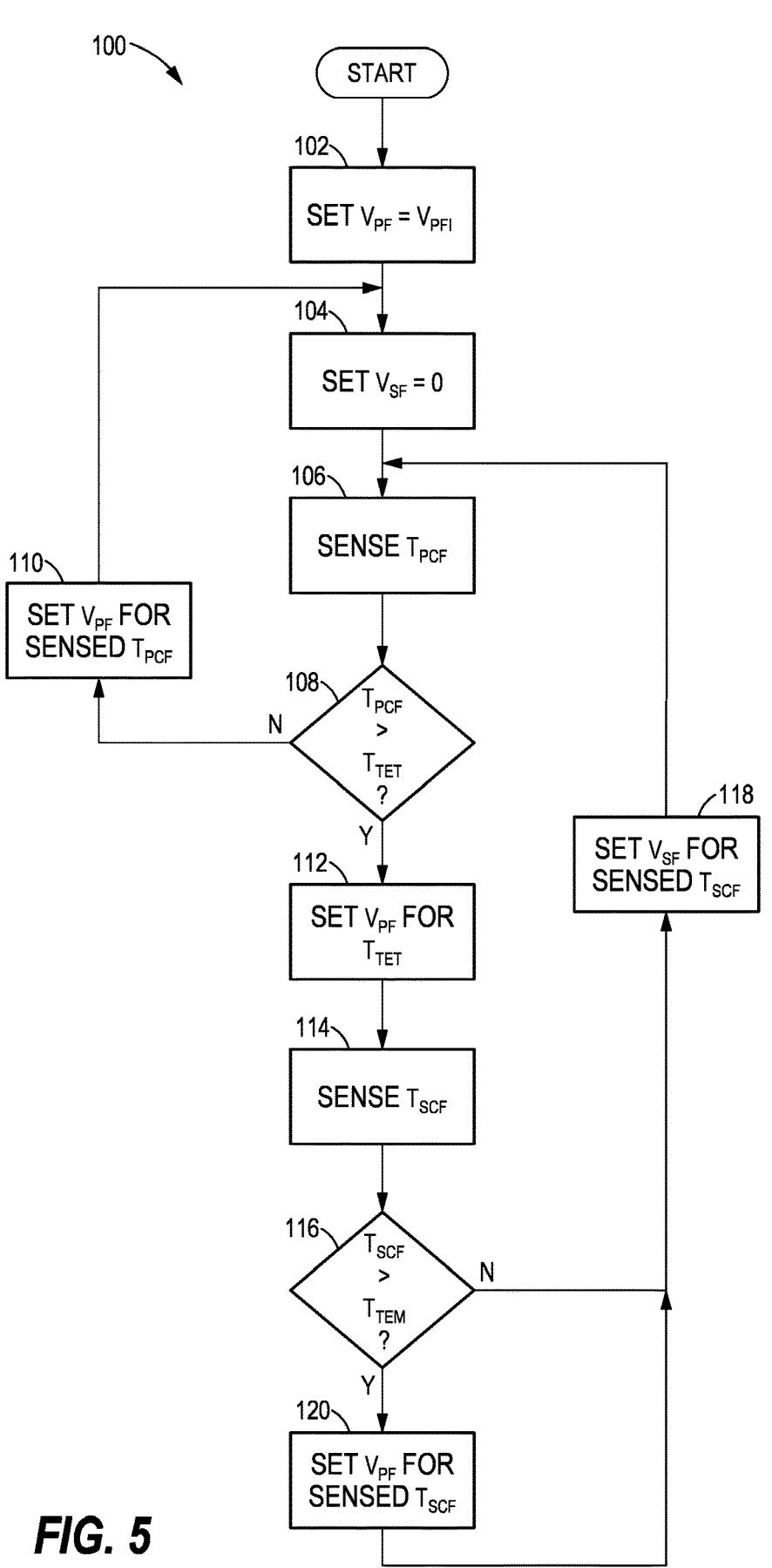
FIG. 5 is a flow diagram of an embodiment of a cooling fluid temperature control routine in accordance with the present disclosure.

As discussed, the control system components of FIG. 4 may control the operation of the work machine cooling system 30 to cool the fuel cell cooling fluid. FIG. 5 illustrates an exemplary cooling fluid temperature control routine 100 for controlling the cooling fans 60, 64 in response to fuel cell cooling fluid temperatures $T_{CFP}$, $T_{CFS}$ measured by the cooling unit temperature sensors 80, 82 to manage the temperature of the fuel cell cooling fluid as the thermal output of the fuel cells 16 changes during operation of the work machine 10. The routine 100 may begin at a block 102 when the work machine 10 is started to set the primary fan speed $v_{PF}$ to an initial primary fan speed $v_{PFI}$. The work machine controller 70 may transmit primary fan control signals to the primary cooling fan 60 to cause the primary cooling fan 60 to operate at the initial primary fan speed $v_{PFI}$. The initial primary fan speed $v_{PFI}$ may be zero or any other fan speed to create airflow to achieve desired heat transfer at the mechanical system cooling unit 32 and the primary fuel cell cooling unit 40. The initial primary fan speed $v_{PFI}$ may be a predetermined fan speed, or may be based on the primary cooling fluid temperature $T_{PCF}$ measured by the primary cooling unit temperature sensor 80. After the initial primary fan speed $v_{PFI}$ is set at the block 102, or contemporaneously therewith, control may pass to a block 104 to set the secondary fan speed $v_{SF}$ to zero under the assumption that a transient thermal event is not occurring at machine startup. The work machine controller 70 may transmit secondary fan control signals to the secondary cooling fans 64 to set the secondary fan speed $v_{SF}$ to zero, or merely omit sending secondary fan control signals so the secondary cooling fans 64 remain idle.

After the fan speeds $v_{PF}$, $v_{SF}$ are set at the blocks 102, 104, control may pass to a block 106 where the fuel cell cooling temperature $T_{CFP}$ at the primary fuel cell cooling unit 40 is sensed. The primary cooling unit temperature sensor 80 may sense the fuel cell cooling temperature $T_{CFP}$ at the primary unit outlet port 44 and transmit corresponding primary temperature sensor signals to the work machine controller 70. Upon receiving the primary temperature sensor signals at the block 106, control may pass to a block 108 where the work machine controller 70 compares the primary cooling fluid temperature $T_{PCF}$ from the primary temperature sensor signals from the primary cooling unit temperature sensor 80 to the transient event threshold temperature $T_{TET}$. If the primary cooling fluid temperature $T_{PCF}$ is not greater than the transient event threshold temperature $T_{TET}$ at the block 108, control passes to a block 110 where the work machine controller 70 transmits primary fan control signals to set the primary cooling fan 60 to operate at a primary cooling fan speed $v_{PF}$ that corresponds to the sensed primary cooling fluid temperature $T_{PCF}$. The program for the routine 100 may store, or access on the memory 74, a lookup table, formula or other method for determining a primary cooling fan speed $v_{PF}$ at which to operate to create sufficient airflow to cool the fuel cell cooling fluid based on the current primary cooling fluid temperature $T_{PCF}$ after the fuel cell cooling fluid has passed through the primary fuel cell cooling unit 40. After the primary cooling fan speed vPF is set at the block 110, control may pass back to the block 104 to ensure the secondary cooling fans 64 are stopped before reevaluating the primary cooling fluid temperature $T_{PCF}$ at the blocks 106, 108.

If the primary cooling fluid temperature $T_{PCF}$ from the primary temperature sensor signals is greater than the transient event threshold temperature $T_{TET}$ at the block 108, then a transient thermal event may be occurring for which the secondary cooling fans 64 should be started. Control may pass to a block 112 where the work machine controller 70 transmits primary fan control signals to the primary cooling fan 60 to operate at a primary cooling fan speed $v_{PF}$ corresponding to the thermal event threshold temperature $T_{TET}$ in the cooling strategy for the work machine cooling system 30. After the primary cooling fan speed $v_{PF}$ is set at the block 112, control may pass to a block 114 where the fuel cell cooling temperature $T_{CF}S$ at the secondary fuel cell cooling unit 50 is sensed. The secondary cooling unit temperature sensor 82 may sense the fuel cell cooling temperature $T_{CF}S$ at the secondary unit outlet port 54 and transmit corresponding secondary temperature sensor signals to the work machine controller 70. Upon receiving the secondary temperature sensor signals at the block 114, control may pass to a block 116 where the work machine controller 70 compares the secondary cooling fluid temperature $T_{SCF}$ from the secondary temperature sensor signals from the secondary cooling unit temperature sensor 82 to the transient event maximum temperature $T_{TEM}$. If the secondary cooling fluid temperature $T_{SCF}$ is not greater than the transient event maximum temperature $T_{TEM}$ at the block 116, control passes to a block 118 where the work machine controller 70 transmits secondary fan control signals to set the secondary cooling fans 64 to operate at a secondary cooling fan speed $v_{SF}$ that corresponds to the sensed secondary cooling fluid temperature $T_{SCF}$. The program for the routine 100 may store, or access on the memory 74, a lookup table, formula or other method for determining a secondary cooling fan speed $v_{SF}$ at which to operate to create sufficient airflow to further cool the fuel cell cooling fluid based on the current secondary cooling fluid temperature $T_{SCF}$ after the fuel cell cooling fluid has passed through the work machine cooling system 30. After the secondary cooling fan speed $v_{SF}$ is set, control may pass back to the block 106 to continue monitoring the cooling fluid temperatures $T_{PCF}$, $T_{SCF}$.

If the secondary cooling fluid temperature $T_{SCF}$ from the secondary temperature sensor signals is greater than the transient event maximum temperature $T_{TEM}$ at the block 116, the work machine cooling system 30 is not generating sufficient heat transfer to cool the fuel cell cooling fluid during the transient thermal event or other power demands on the fuel cells 16 without additional assistance from the primary cooling fan 60. Control may pass to a block 120 where the work machine controller 70 transmits primary fan control signals to the primary cooling fan 60 to operate at a primary cooling fan speed $v_{PF}$ corresponding to the secondary cooling fluid temperature $T_{SCF}$, and then to the block 118 to set the secondary cooling fan speed $v_{SF}$ based on the secondary cooling fluid temperature $T_{SCF}$ before returning to the block 106 to continue evaluating the cooling fluid temperatures $T_{PCF}$, $T_{SCF}$. Execution of the routine 100 may continue in this manner until the work machine 10 is shut down.

The work machine cooling system 30 and cooling fluid temperature control routine 100 in accordance with the present disclosure are capable of cooling all the mechanical and electrical systems of the work machine 10 while having the flexibility to cool the fuel cells 16 during transient thermal events that are particular to electric drive work machines 10. The addition of the secondary fuel cell cooling unit 50 increases the heat exchange area that can be utilized to cool the fuel cell cooling fluid. In normal ambient conditions, the primary fuel cell cooling unit 40 is sufficient to cool all of the machine systems. During fuel cell heat rejection transient events, the secondary fuel cell cooling unit 50 can peak shave the additional heat dissipation requirement instead of increasing the primary cooling fan speed $v_{PF}$ when it is not required to increase the airflow on the mechanical system cooling unit 32, thereby increasing the efficiency of the work machine cooling system 30. During warm ambient conditions, both cooling fans 60, 64 can be running to meet the overall heat dissipation requirements for the work machine 10. Those skilled in the art will understand that the work machine cooling system 30 in accordance with the present disclosure offers a higher cooling capacity and additional total airflow, better handling of transient thermal events with less power draw, and reduced fan noise during normal operations.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A work machine cooling system for cooling a fuel cell cooling fluid for fuel cells of a work machine, the work machine cooling system comprising:

a primary fuel cell cooling unit having a primary unit inlet port and a primary unit outlet port, wherein the primary unit inlet port is fluidly connected to receive the fuel cell cooling fluid from the fuel cells;

a secondary fuel cell cooling unit having a secondary unit inlet port and a secondary unit outlet port, wherein the secondary unit inlet port is fluidly connected to the primary unit outlet port to receive the fuel cell cooling fluid from the primary fuel cell cooling unit, and the secondary unit outlet port is fluidly connected to discharge the fuel cell cooling fluid to the fuel cells;

a primary cooling fan disposed proximate the primary fuel cell cooling unit to discharge a primary airflow onto the primary fuel cell cooling unit; and a secondary cooling fan disposed proximate the secondary fuel cell cooling unit to discharge a secondary airflow onto the secondary fuel cell cooling unit.

2. The work machine cooling system of claim 1, wherein the primary airflow is not discharged onto the secondary fuel cell cooling unit and the secondary airflow is not discharged onto the primary fuel cell cooling unit.

3. The work machine cooling system of claim 1, wherein the secondary cooling fan comprises a plurality of secondary cooling fans.

4. The work machine cooling system of claim 1, wherein the work machine has a cooling system opening at a front end, wherein the primary fuel cell cooling unit and the secondary fuel cell cooling unit are disposed proximate the cooling system opening with surfaces opposite the primary cooling fan and the secondary cooling fan facing forward at the cooling system opening so that an airflow caused by travel of the work machine flows over the surfaces of the primary fuel cell cooling unit and the secondary fuel cell cooling unit.

5. The work machine cooling system of claim 1, wherein the secondary cooling fan is configured to activate or deactivate based on whether a primary cooling fluid temperature at the primary fuel cell cooling unit reaches a transient event threshold temperature.

6. The work machine cooling system of claim 1, comprising a mechanical system cooling unit adjacent the primary fuel cell cooling unit and having a mechanical unit inlet port and a mechanical unit outlet port, wherein the mechanical unit inlet port is fluidly connected to receive mechanical system cooling fluid from a mechanical system of the work machine, and wherein the mechanical unit outlet port is fluidly connected to discharge a machine system cooling fluid to a machine system.

7. The work machine cooling system of claim 6, wherein the primary airflow is discharged onto the mechanical system cooling unit and the primary fuel cell cooling unit.

8. The work machine cooling system of claim 6, wherein the secondary airflow is not discharged onto the mechanical system cooling unit.

9. A method for cooling fluid temperature control of a primary power source cooling fluid for a primary power source of a work machine, wherein the work machine includes a primary power source cooling unit having a primary unit inlet port fluidly connected to receive the primary power source cooling fluid from the primary power source, and a primary unit outlet port, and wherein the work machine includes a secondary power source cooling unit fluidly connected to the primary unit outlet port to receive the primary power source cooling fluid from the primary power source cooling unit, and a secondary unit outlet port fluidly connected to discharge the primary power source cooling fluid to the primary power source, the method comprising:

comparing a primary cooling fluid temperature of the primary power source cooling fluid at the primary power source cooling unit to a transient event threshold temperature;

in response to determining that the primary cooling fluid temperature is not greater than the transient event threshold temperature, setting a primary cooling fan to a first primary cooling fan speed corresponding to the primary cooling fluid temperature to discharge a first airflow onto the primary power source cooling unit, and setting a secondary cooling fan to a first secondary cooling fan speed equal to zero to prevent discharge of a second airflow onto the secondary power source cooling unit; and in response to determining that the primary cooling fluid temperature is greater than the transient event threshold temperature, setting the primary cooling fan to a second primary cooling fan speed corresponding to the transient event threshold temperature to discharge the first airflow onto the primary power source cooling unit, and setting the secondary cooling fan to a second secondary cooling fan speed corresponding to a secondary cooling fluid temperature of the primary power source cooling fluid at the secondary power source cooling unit to discharge the second airflow onto the secondary power source cooling unit.

10. The method of claim 9, comprising:

in response to determining that the primary cooling fluid temperature is greater than the transient event threshold temperature, comparing the secondary cooling fluid temperature to a transient event maximum temperature; and in response to determining that the secondary cooling fluid temperature is not greater than the transient event maximum temperature, maintaining the primary cooling fan at the second primary cooling fan speed corresponding to the transient event threshold temperature.

11. The method of claim 9, comprising:

in response to determining that the primary cooling fluid temperature is greater than the transient event threshold temperature, comparing the secondary cooling fluid temperature to a transient event maximum temperature; and in response to determining that the secondary cooling fluid temperature is greater than the transient event maximum temperature, setting the primary cooling fan at a third primary cooling fan speed corresponding to the secondary cooling fluid temperature.

12. The method of claim 9, comprising:

sensing the primary cooling fluid temperature at the primary unit outlet port; and sensing the secondary cooling fluid temperature at the secondary unit outlet port.

13. The method of claim 9, wherein the primary power source comprises fuel cells.

14. The method of claim 9, comprising, in response to machine startup of the work machine, setting the primary cooling fan to an initial primary fan speed (VPFI), and setting an initial secondary cooling fan speed equal to zero.

15. A work machine, comprising:

a primary fuel cell cooling unit having a primary unit inlet port and a primary unit outlet port, wherein the primary unit inlet port is fluidly connected to receive a fuel cell cooling fluid from fuel cells;

a secondary fuel cell cooling unit having a secondary unit inlet port and a secondary unit outlet port, wherein the secondary unit inlet port is fluidly connected to the primary unit outlet port to receive the fuel cell cooling fluid from the primary fuel cell cooling unit, and the secondary unit outlet port is fluidly connected to discharge the fuel cell cooling fluid to the fuel cells;

a primary cooling fan disposed proximate the primary fuel cell cooling unit to discharge a primary airflow onto the primary fuel cell cooling unit;

a secondary cooling fan disposed proximate the secondary fuel cell cooling unit to discharge a secondary airflow onto the secondary fuel cell cooling unit;

a primary cooling unit temperature sensor operatively coupled to the primary fuel cell cooling unit;

a secondary cooling unit temperature sensor operatively coupled to the secondary fuel cell cooling unit; and a work machine controller operatively connected to the primary cooling fan, the secondary cooling fan, the primary cooling unit temperature sensor and the secondary cooling unit temperature sensor, the work machine controller being programmed to:

receive primary temperature sensor signals from the primary cooling unit temperature sensor, determine a primary cooling fluid temperature of the fuel cell cooling fluid at the primary fuel cell cooling unit based on the primary temperature sensor signals, receive secondary temperature sensor signals from the secondary cooling unit temperature sensor, determine a secondary cooling fluid temperature of the fuel cell cooling fluid at the secondary fuel cell cooling unit based on the secondary temperature sensor signals, compare the primary cooling fluid temperature to a transient event threshold temperature;

in response to determining that the primary cooling fluid temperature is not greater than the transient event threshold temperature, transmit primary fan control signals to the primary cooling fan to set the primary cooling fan to a first primary cooling fan speed corresponding to the primary cooling fluid temperature to discharge the primary airflow onto the primary fuel cell cooling unit, and transmit secondary fan control signals to the secondary cooling fan to set the secondary cooling fan to a first secondary cooling fan speed equal to zero to prevent discharge of the secondary airflow onto the secondary fuel cell cooling unit; and in response to determining that the primary cooling fluid temperature is greater than the transient event threshold temperature, transmit the primary fan control signals to the primary cooling fan to set the primary cooling fan to a second primary cooling fan speed corresponding to the transient event threshold temperature to discharge the primary airflow onto the primary fuel cell cooling unit, and transmit the secondary fan control signals to the secondary cooling fan to set the secondary cooling fan to a second secondary cooling fan speed corresponding to the secondary cooling fluid temperature to discharge the secondary airflow onto the secondary fuel cell cooling unit.

16. The work machine of claim 15, wherein the work machine controller is programmed to:

in response to determining that the primary cooling fluid temperature is greater than the transient event threshold temperature, compare the secondary cooling fluid temperature to a transient event maximum temperature; and in response to determining that the secondary cooling fluid temperature is not greater than the transient event maximum temperature, transmit primary fan control signals to the primary cooling fan to set the primary cooling fan at the second primary cooling fan speed corresponding to the transient event threshold temperature.

17. The work machine of claim 15, wherein the work machine controller is programmed to:

in response to determining that the primary cooling fluid temperature is greater than the transient event threshold temperature, comparing the secondary cooling fluid temperature to a transient event maximum temperature; and in response to determining that the secondary cooling fluid temperature is greater than the transient event maximum temperature, transmit primary fan control signals to the primary cooling fan to set the primary cooling fan at a third primary cooling fan speed corresponding to the secondary cooling fluid temperature.

18. The work machine of claim 15, wherein the primary cooling unit temperature sensor is operatively coupled to the primary fuel cell cooling unit at the primary unit outlet port.

19. The work machine of claim 15, wherein the secondary cooling unit temperature sensor is operatively coupled to the secondary fuel cell cooling unit at the secondary unit outlet port.

20. The work machine of claim 15, wherein the work machine controller is programmed to, in response to machine startup of the work machine, set the primary cooling fan to an initial primary fan speed (vPFI), and set an initial secondary cooling fan speed equal to zero.

21. The work machine of claim 15, wherein the primary airflow is not discharged onto the secondary fuel cell cooling unit and the secondary airflow is not discharged onto the primary fuel cell cooling unit.

* * * * *